Mar. 6, 1923.
D. LEE
BOX CAR DOOR
Filed July 12, 1921
1,447,876
2 sheets-sheet 1
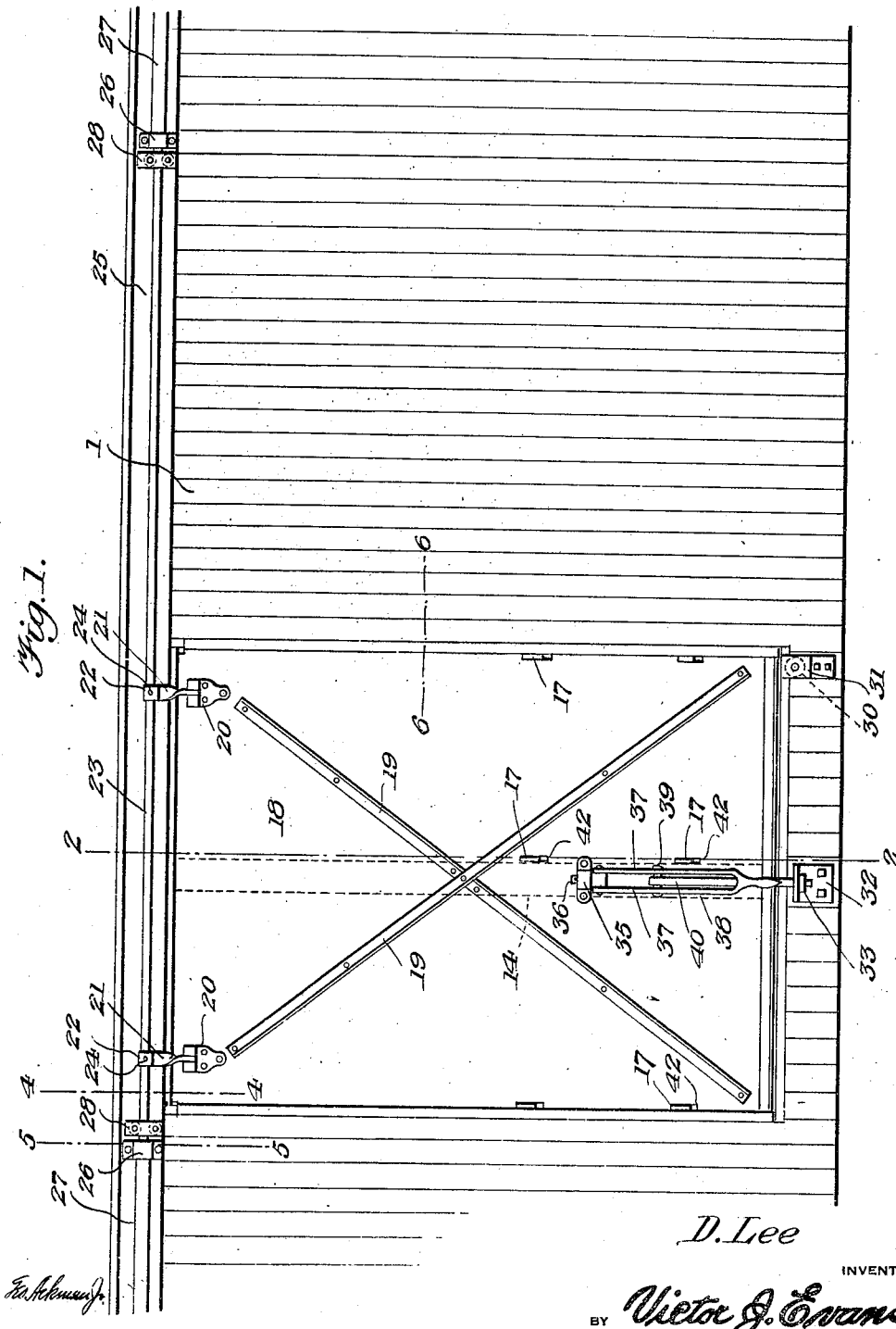
D. Lee
INVENTOR

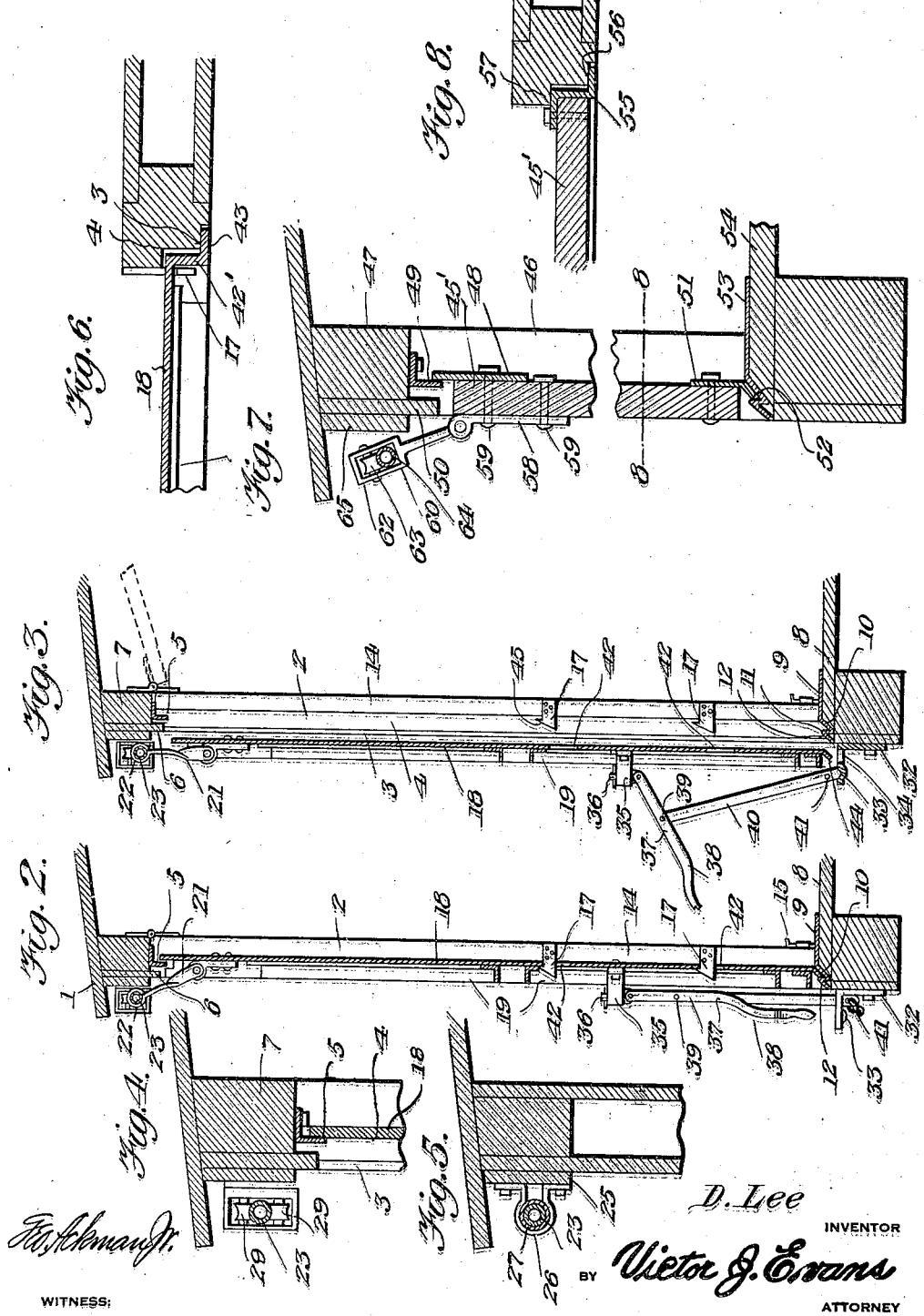

Patented Mar. 6, 1923.

1,447,876

UNITED STATES PATENT OFFICE.

DANIEL LEE, OF COLUMBUS, GEORGIA.

BOX-CAR DOOR.

Application filed July 12, 1921. Serial No. 484,166.

*To all whom it may concern:*

Be it known that I, DANIEL LEE, a citizen of the United States, residing at Columbus, in the county of Muscogee and State of Georgia, have invented new and useful Improvements in Box-Car Doors, of which the following is a specification.

My present invention has reference to sliding doors, and locking means therefor. In carrying out my invention, I propose to produce, in a sliding door, means whereby the door is supported outwardly of, and in open position in front of the opening which is to be closed, lever operated means for moving the door upwardly from such position into the opening, and locking means for both the door and the operating means for positively securing the door in closed position.

It is also my aim to produce, in a sliding door, hanger means which will retain the door, when in open position, outwardly with respect to the structure on which it is suspended, and thereby insure the free sliding of the door, means limiting the sliding movement of the door in both directions, lever operated means for moving the door into the opening therefor, interengaging means between the door and the walls of the opening whereby a tight fit is provided between these members and locking means for the lever operating means for effectively holding the door in closed position.

It is also my object to produce a sliding door which is primarily devised for use on freight cars in which the door is suspended from a rail or track on the car in a manner to lower the door with respect to the door opening as it is moved to its open position and to move the door outward from the car to insure the free sliding of the door, a lever carrying a fulcrum bar being pivotally secured to the door and designed, when the door is brought opposite the opening to be swung to arrange the fulcrum bar on a suitable element secured to the car and by operating the lever to raise the door and move the same bodily into the door opening, interengaging means being provided between the door and the walls of the opening to insure a tight joint between these parts, and means being also provided for locking the fulcrum bar lever to the car to prevent the operation of these parts and to also sustain the door in closed position.

It is a still further object to produce a sliding door for freight cars, in which the car has hinged therein, at the door opening a swinging post having catches thereon, said post being suspended from the roof of the car when the door is open and being retained in a vertical locked position when the door is closed, said door being suspended from a track in a manner whereby the same will be moved downwardly with respect to the opening and outwardly with respect to the car when the door is in open position, the door having its ends and edges provided with offset plates designed for engagement with recesses or grooves in the frame of the door opening, the door having on its outer face a pivoted lever to which is pivoted a fulcrum bar that is designed, when the door is moved opposite the door opening, to engage a depression in a bracket that is secured to the car and when the lever is swung downwardly, to cause an upward and inward movement of the door to bring the same into the opening and the plates thereof into lapping engagement with the plates of the door frame, the latches of the post passing through slots in the door for holding the door against outward movement, and the bracket having a slot therethrough for the reception of the fulcrum bar when the door is in closed position, and locking means being provided for retaining the fulcrum bar in the said slot.

It is still a further object of the invention to simplify and improve the existing art by producing a sliding door for cars, and suspending and operating means therefor which shall be of such construction that when in closed position a positive grain tight joint, and practically an air tight joint will be obtained between the door and jambs therefor.

The foregoing, and other objects which will present themselves as the nature of the invention is better understood, may be accomplished by a construction, combination and operative association of parts, such as is disclosed by the drawings which accompany and which form part of this specification.

In the drawings:—

Figure 1 is an elevation of a freight car showing a door in accordance with this invention mounted thereon, the said door being in closed position.

Figure 2 is a sectional view on the line 2—2 of Figure 1.

Figure 3 is a substantially similar section but showing the door swung outwardly and downwardly from the opening, the dotted lines indicating the post swung against the top of the car as when the door is fully open.

Figure 4 is a sectional view on the line 4—4 of Figure 1.

Figure 5 is a sectional view on the line 5—5 of Figure 1.

Figure 6 is a sectional view on the line 6—6 of Figure 1.

Figure 7 is a vertical sectional view on an enlarged scale through a modified construction, the door being of wood and the hanger being slightly different from that previously illustrated.

Figure 8 is a fragmentary horizontal sectional view approximately on the line 8—8 of Figure 7.

While in the accompanying drawings I have illustrated my sliding door in connection with a freight car, it is to be understood that the improvement is not to be thus limited in its useful capacity and that I am entitled to employ my construction for closing the openings in any other bodies. It is also to be understood that any desired material may be employed and that I am not to be limited to shape, size, proportion, etc.

Referring now to the drawings in detail, a portion of a freight car, of a common construction, is indicated by the numeral 1 and the door opening by the numeral 2. The sides or jambs of the door opening are rabbeted on their outer confronting corners, being provided upon their faces with a recess 3 and upon their sides with a like recess 4 that of course communicates with the recess 3. The top rail of the door opening is provided with an angle plate whose vertical portion 5 is disposed opposite but away from a plate 6 secured on the outer face of the top rail 7. Thus a groove or channel is provided between the plates 5 and 6. The sill or threshold, indicated by the numeral 8 has its outer edge beveled, and secured upon the face of the said sill is a plate 9 that has an angle portion 10 disposed over the beveled edge of the threshold strip, the portion 10 of the plate having its end extended at an opposite or upward angle, as indicated by the numeral 11, and from thence is bent downwardly, as at 12. The plate 9 thus has its outer edge provided with a substantially V-shaped groove.

Hingedly secured, as at 13, to the top rail 7 is a post 14. The post is of a length corresponding to the height of the door opening and has upon its inner face, at its lower end a bolt 15 that is designed to be received by the straight portion of the threshold plate 9, and in this manner the post 14 may be locked in the door opening. The post 14, when the door is opened is swung against the roof of the car and held thus suspended in any desired or preferred manner. The elevated position of the post is indicated by the dotted lines in Figure 3 of the drawings. The post has secured thereon outwardly extending latches 17 respectively.

In the preferred embodiment of the improvement, the door 18 is constructed of sheet metal and has its outer face reinforced by crossed angle braces 19. The door, upon its outer face, and adjacent to its upper corners has bolted or otherwise secured thereto the bracket members 20 of the hangers. Each bracket has pivoted thereon the swinging member 21 of the hanger. Each of the members 21 has its free end rounded upon itself or otherwise provided with an eye 22 through which passes a cross sectionally rounded rod 23, the said rods being secured in the eyes by pins 24.

On the outer face of the plate 6 of the car there is secured an additional plate or strip 25. To this strip there are connected by brackets 26 tubular members 27 respectively that receive therein the ends of the rods 23. Outward of the brackets 26 there are secured on the strip 25 housings 28 in which there are journaled upper and lower spaced grooved wheels 29 between which the rod 23 passes, the said wheels guiding the rod in its movement through the tubular members 27. The hinged connection between the hanger members 20 and 21 is such that when the door is moved out of the door opening, and these members are in alignment with each other, the door will drop below the opening, so that its upper edge will be brought a slight but suitable distance below the rail 7 and its lower edge a similar distance below the threshold strip. In addition to this, the hinged hangers permit of the door being moved outwardly away from the side of the car, and when in such position, the lower edge of the door is received in the grove of a wheel 30 which has its shaft or trunnions journaled in suitable bearings in a yoke-like housing 31 that is secured to the outer face of the car adjacent to the lower right hand corner of the door opening. When the door is in such position it will be evident that the same can be readily slid away from the door opening, and the contacting engagement of one of the members 24 of the hanger with one of the housings 28 will limit the sliding of the door to open position.

Below the sill or threshhold there is secured upon the outer face of the car an angle bracket 32. The horizontal member of this bracket is provided upon its upper face and adjacent to its outer edge with a cup-like depression 33 and inward of the said depression with an opening 34. On the outer face of the door 18 there is secured an outstanding bracket 35 that provides a bearing for a swivel member in the nature of a pin 36, suitable means being provided for retaining the pin in its bearing. The pin has pivoted to its sides, at the portion thereof below its bearing, the arms 37 provided by the bifurcated inner portion of a lever 38. Pivoted, as at 39 between the arms 37 of the lever 38 is a fulcrum bar 40. The lower end of this bar is rounded and the said bar inward of the said rounded end is provided with a transverse opening 41.

The door is provided with slots 42 that are disposed opposite the catches 17 on the post 14 when the post is swung vertically in the door opening.

When the door is swung on its track to arrange the same opposite the door opening, the lever 38 is swung to the position illustrated in Figure 3 of the drawings, and the fulcrum rod 40 is moved to bring its lower rounded end into the depression 33 on the horizontal flange of the bracket 32. A downward push is then exerted on the lever 38 which will have a tendency of both moving the door inward of the opening and upwardly in said opening. This brings the openings 42 in a position to receive therethrough the catches 17 on the posts. The openings 42 are of a greater length than the width of the catches and consequently the door is permitted to move a determined distance upward in the door opening so that the upper edge of the door will be positioned inside of the vertical portion of the angle plate 5. It should have been stated that the edges of the door are flanged outwardly, as at 42' and from thence extended to provide lips 43. The flanges 42' are received in the depressions 4 of the jambs of the door, and the lips 43 are received in the depressions 3 of the said jambs when the door is closed. The door is then permitted to gravitate a slight distance downward in the door opening, and the lower edge of the door which is provided with an angle flange 44 is received in the substantially V-shaped groove provided on the plate 9 that is secured to the threshold strip. In this manner, it will be seen that there are coengaging means between the sides and edges of the door and all of the members provided by the door opening. The lipped portions 45 of the catches 17 are now brought into contacting engagement with the outer face of the door 18, the lever 38 is swung upwardly, permitting the fulcrum rod 40 to be drawn out of the depression 33 and to pass through the slot 34 in the bracket 32. A seal or like securing means is passed through the opening 41 in the fulcrum bar, the said opening being now arranged directly below the horizontal plate of the bracket 32. In this manner it will be noted that the door is not only easily, quickly and accurately brought to closed position, but that a grain tight and practically air tight joint is provided between the door and the walls of the openings therefor, and also that the door is effectively locked in closed position. To open the door the operation of the lever and the fulcrum member in closing the door is reversed.

In Figures 7 and 8 of the drawings, the door 45' comprises a wooden structure, but the door opening 46 of the car 47 has its walls similarly constructed to that previously described. The door 45' is very similar in construction to the door 18, but instead of the flanges on the edges of the latter plates are used to engage the grooves in the sides of the door opening. A plate 48 is bolted on the inner face of the door 45', and is designed to engage the inner side of plate 49 which is secured inwardly of the plate 50 on the top rail of the doorway, a plate 51, having its lower edge inclined downwardly and outwardly is designed to be received in the V-shaped groove 52 on the outer end of a plate 53 that is secured on the threshold strip 54 and an angle plate 55 is secured to the edges of the door that are designed to be received in recesses or depressions 56 and 57, similar to the depressions 3 and 4. The hanger is of a somewhat different construction to that previously described, the fixed element of the hanger, indicated by the numeral 58 is connected to the door by the bolts 59 that secure the plate 48 upon the inner face of the door and to the member 58 the swinging member is hingedly connected. The swinging member, indicated by the numeral 60 has its outer end formed with a yoke 62 between the side members of which there is journaled the shaft or trunnion of a grooved wheel 63, and this grooved wheel travels on a cross sectionally rounded rail 64 that is secured to the outer plate 65, similar to the plate 25, of the car. While not disclosed in Figures 7 and 8 of the drawings, the door 58 is provided with a lever similar to the lever 38 that carries a fulcrum bar similar to the bar 40 and there is a bracket similar to the bracket 32 that is engaged by the fulcrum rod and that is locked to the bracket when the door is closed. It is to be noted that the lips provided by the angle members on the lower edge of the door, when brought into contact with the lips provided outward of the angle grooves of the plates on the threshold strips, serve as guide members for directing the door both inwardly and upwardly in the closing of the door, and it is thought that the foregoing description, when taken in connection with the drawings will fully set forth the construction, operation and advantages of the improvement and that further detailed description will therefore not be considered necessary.

Having described the invention, I claim:—

1. In combination with a structure having a door opening, a door for closing the opening and a track secured above the door, of jointed hangers between the track and door whereby the upper and lower edges of the door are disposed outwardly and slightly below the upper and lower walls of the door opening respectively when the door is in open position, anti-frictional guide means receiving the lower edge of the door when in such position, a slotted bracket on the door below the opening, a lever pivoted to the door, a fulcrum rod pivoted to the lever, and said lever designed to be operated when the fulcrum rod is arranged on the bracket to arrange and to move the door into the opening, when the said door is brought opposite the opening, interengaging means between the door and opening, guide means provided by the lower interengaging means whereby to direct the door in its movement into the opening, and said fulcrum rod, when the door is closed designed to be received in the slot of the bracket.

2. In combination with a structure having a door opening and a door for closing the opening, of a track on the structure above the door opening, hollow members secured to the structure and receiving the ends of the track therein, anti-frictional means between the track and said members, hangers comprising jointed sections between the track and door, whereby, when the door is open the upper and lower edges of the same will be arranged outwardly of and slightly below the upper and lower walls of the door opening respectively, revoluble guide and supporting means engaging the lower edge of the door when the latter is open, a hinged post in the structure designed to be arranged in the doorway, latches thereon, means for locking the post in vertical position to arrange the latches opposite the door and for sustaining the post in the structure when in door engaging position, a bracket on the structure below the door opening, a lever pivoted to the door, a fulcrum rod pivoted to the lever and designed to rest on the bracket, when the door is brought opposite the opening, and, upon the depression of the lever to raise the door and move the same into the opening, means on the door receiving the latches when in closed position, interengaging means between the door and the walls of the opening, the lower interengaging means providing guides for directing the door to closed position, and means for locking the fulcrum bar to the bracket and the lever against the fulcrum bar, when the door is closed.

3. In combination with a structure having a door opening, a door for closing said opening, said door having openings therein, a post hingedly mounted in the door opening, latches mounted on said post adapted to enter the openings in the door when the door is closed, a track on the structure above the door opening, hangers depending from the track and pivotally secured to the door, said hangers being adapted to carry the upper and lower edges of the door outwardly of and slightly below the top and bottom of the door opening respectively when the door is opened, brackets having anti-frictional elements therein secured to the structure and supporting the track, a roller mounted below the door opening adapted to be engaged by the lower edge of the door when said door is opened, lever operated means for moving the door upwardly into the opening, locking means for the lever operated means, and interengaging means between the edges of the door and the sides of the opening to provide a tight joint.

4. In combination with a structure having a door opening provided with recesses in the sides of the frame thereof, an angle plate secured to the top of said opening, a plate secured to the bottom of said opening having a channel therein, a door having openings therein, flanges on the edges of the door adapted to engage said recesses and channel, a track secured to the structure above the door opening, hanger members pivotally supporting said door from the track in a position outwardly of the opening to permit sliding movement of same, means on the structure providing a support and a guide for the door when in open position, lever operated means for moving the door into and out of the opening, a post mounted in the opening, and latches carried by the post adapted to enter the openings in the door when same is moved to closed position on its hangers.

In testimony whereof I affix my signature.

DANIEL LEE.